US011745871B2

(12) United States Patent
Kim et al.

(10) Patent No.: US 11,745,871 B2
(45) Date of Patent: Sep. 5, 2023

(54) METHOD FOR ANTI-DRONE USING GPS SPOOFING SIGNAL AND SYSTEM THEREFORE

(71) Applicant: Korea Advanced Institute of Science and Technology, Daejeon (KR)

(72) Inventors: Yongdae Kim, Daejeon (KR); Juhwan Noh, Daejeon (KR); Yujin Kwon, Daejeon (KR); Hocheol Shin, Daejeon (KR); Dohyun Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 424 days.

(21) Appl. No.: 16/726,049

(22) Filed: Dec. 23, 2019

(65) Prior Publication Data

US 2021/0047034 A1 Feb. 18, 2021

(30) Foreign Application Priority Data

Aug. 12, 2019 (KR) .......................... 10-2019-0097929

(51) Int. Cl.
*B64C 39/02* (2023.01)
*G08G 5/00* (2006.01)
*G05D 1/00* (2006.01)
*B64U 101/00* (2023.01)

(52) U.S. Cl.
CPC .......... *B64C 39/024* (2013.01); *G05D 1/0055* (2013.01); *G08G 5/006* (2013.01);
(Continued)

(58) Field of Classification Search
CPC .............. B64C 39/024; B64C 2201/12; B64C 2201/145; B64C 2201/146; G05D 1/0055; G08G 5/006
See application file for complete search history.

(56) References Cited

U.S. PATENT DOCUMENTS 9,529,360 B1 * 12/2016 Melamed ................. H04K 3/65
10,044,465 B1 * 8/2018 Hetsko ............... B64D 45/0031
(Continued)

FOREIGN PATENT DOCUMENTS

CN          108833049 B  *  3/2020  ............. H04K 3/224

OTHER PUBLICATIONS

Noh et al., "Tractor Beam: Safe-hijacking of Consumer Drones with Adaptive GPS Spoofing," Apr. 2019, ACM Transactions on Privacy and Security, vol. 22, No. 2, Article 12, 26 pages. (Year: 2019).*
(Continued)

*Primary Examiner* — Elaine Gort
*Assistant Examiner* — Anthony M Gartrelle
(74) *Attorney, Agent, or Firm* — CHRISTENSEN O'CONNER JOHNSON KINDNESS PLLC (57) ABSTRACT

Disclosed are an anti-drone method using a GPS spoofing signal and a system thereof. According to an embodiment of the inventive concept, an anti-drone method may include injecting a GPS spoofing signal to analyze a drone feature of a target drone and hijacking the target drone by injecting a GPS spoofing signal into the target drone based on a drone hijacking strategy corresponding to the analyzed drone feature among predefined drone hijacking strategies. The analyzing of the drone feature may include injecting the GPS spoofing signal to analyze a safety device mechanism (GPS fail-safe) and a path-following algorithm of the target drone.

20 Claims, 7 Drawing Sheets

(52) U.S. Cl.
CPC .... *B64U 2101/00* (2023.01); *B64U 2201/104* (2023.01); *B64U 2201/20* (2023.01)

(56) References Cited

U.S. PATENT DOCUMENTS

| | | | |
|---|---|---|---|
| 2017/0094527 A1* | 3/2017 | Shattil | H04K 3/45 |
| 2017/0237520 A1* | 8/2017 | Morrow | H04K 3/825 |
| 2018/0062786 A1* | 3/2018 | Hodge | H04K 3/825 |
| 2020/0064443 A1* | 2/2020 | Yoon | B64C 39/024 |

OTHER PUBLICATIONS

Seo, Seong-Hun, Effect of Spoofing on Unmanned Aerial Vehicle using Counterfeited GPS Signal, May 11, 2015, Journal of Positioning, Navigation, and Timing, vol. 4 Issue 2, pp. 57-65 (Year: 2015).*

Ahman y. Javaid, Single and Multiple UAV Cyber-Attack Simulation and Performance Evaluation, Feb. 17, 2015, EAI Endorsed Transactions on Scalable Information Systems, vol. 2, Issue 4, e4, pp. 1-11 (Year: 2015).*

Javid, Single and Multiple UAV Cyber-Attack Simulation and Performance Evaluation, 2015, EAI Endorsed Transactions on Scalable Information Systems, 1-11 (Year: 2015).*

Seong-Hun, Effect of Spoofing on Unmanned Aerial Vehicle using Counterfeited GPS Signal, 2015, JPNT Journal of Positioning, Navigation, and Timing, JPNT 4(2), 57-65 (Year: 2015).*

Noh, J., et al., "Tractor Beam: Safe-Hijacking of Consumer Drones With Adaptive GPS Spoofing," ACM Transactions an Privacy and Security (TOPS):22(2), Article 12, Apr. 2019, 26 pages.

* cited by examiner

METHOD FOR ANTI-DRONE USING GPS SPOOFING SIGNAL AND SYSTEM THEREFORE

CROSS-REFERENCE TO RELATED APPLICATIONS

A claim for priority under 35 U.S.C. § 119 is made to Korean Patent Application No. 10-2019-0097929 filed on Aug. 12, 2019, in the Korean Intellectual Property Office, the entire contents of which are hereby incorporated by reference.

BACKGROUND

Embodiments of the inventive concept described herein relate to an anti-drone technology using a GPS spoofing signal, and more particularly, relate to an anti-drone method that is capable of being effectively hijacking a drone invading a specific zone by injecting a GPS spoofing signal to analyze the feature of the drone and automatically generating a hijacking strategy based on the analysis result, and a system thereof.

Nowadays, there is an increase in the amount of economic loss caused by the use of drones for terrorism or crime or by unauthorized entry into a protection zone. For example, there was a case where a drone including radioactive material was flown to the Japanese prime minister's residence in 2015; there has been a case where groups such as IS or the like have weaponized by loading explosives on civil drones and caused casualties in the conflict zone; there was an attempt to assassinate Venezuela's president in 2018, using a drone; there was a case where a drone appearing at an airport has caused the cancellation of a flight and thus economic losses occur. Furthermore, according to the latest report from the Federal Aviation Administration (FAA) in US and Airprox Board in UK, many accident cases and abnormal access problems, for example, the total of 103 cases in only the second quarter of 2018, have occurred.

Most anti-drone schemes focus on disabling drone flight, such as jamming, laser attacks, nets, and the like. However, these anti-drone schemes are not suitable for the situation where a drone needs to be safely treated as quickly as possible, such as drones equipped with explosives or weapons for terrorism, drones that have illegally entered the airport, or the like.

Because the anti-drone schemes by laser attacks, shootings, or the like are very difficult to accurately target distant drones and are a dangerous weapon, it is very difficult to secure ambient safety. Moreover, because the materials remain in the protection zone when the drone carries dangerous materials, the limits are obvious.

An illegal drone should be able to be neutralized before the illegal drone may achieve its purpose. However, when the area to be protected is large because the anti-drone schemes by a net has a short range, it takes a long time for the drone to get close enough to enter the range.

Many drones hover in place when jamming occurs, and thus the drones remain in flight until the drones run out of battery. Accordingly, in the anti-drone technology by jamming, the speed at which the drones are handled may be slow. Moreover, because the materials remain in the protection zone when the drone carries dangerous materials, the limitations are obvious.

The research on hijacking drones through a method of allowing drones to mistake the location via GPS spoofing signals and the inventive concept of anti-drone using the same have been presented. However, there are limitations in the following aspects.

As the limitation of versatility, the drone hijacking strategy of the conventional research may be applied to only the drones of a specific type or only the drones operating in a specific flight mode.

As the limitation of the accuracy and stability of the hijacking direction, when a drone carries dangerous substances, the hijacking direction of the drone needs to be accurate such that the drone does not collide with the surrounding structure, and the drone may be hijacked stably without changing the direction. However, the conventional approaching method that does not consider the features of a drone is not suitable for anti-drone because the hijacking direction is inaccurate and there may be a sudden direction change during hijacking.

Furthermore, in the case of the conventional inventive concept of anti-drone, only the use of GPS spoofing signals for anti-drone is described; specifically, the method about which features of drone should be considered for safe hijacking of a drone and what procedures should be used to determine a fake GPS location is not described.

For the purpose of overcoming the above limitations, anti-drone devices need to grasp the drone's features through preliminary analysis and need to have the strategy suitable for this. The feature that may vary by the manufacturer or model of a drone is a safety device (GPS fail-safe) mechanism and a path-following algorithm.

When the safety device mechanism is described, a drone activates the fail-safe function and hovers using only the inertial sensor without relying on GPS when a GPS error occurs. The mechanism about which flight mode the drone will operate when fail-safe is activated and how the drone will behave when the GPS receiver is restored when activated varies by the manufacturer or model of a drone.

When the path-following algorithm is described, the algorithm also varies depending on the manufacturer or model of a drone, as the algorithm in which the autonomous drone moves along a path predetermined before the flight but the drone returns to the path when the drone deviates from the path due to external factors.

SUMMARY

According to an exemplary embodiment, an anti-drone method that is capable of being effectively hijacking a drone invading a specific zone by injecting a GPS spoofing signal to analyze the feature of the drone and automatically generating a hijacking strategy based on the analysis result, and a system thereof.

According to an exemplary embodiment, an anti-drone method includes injecting a GPS spoofing signal to analyze a drone feature of a target drone and hijacking the target drone by injecting a GPS spoofing signal into the target drone based on a drone hijacking strategy corresponding to the analyzed drone feature among predefined drone hijacking strategies.

The analyzing of the drone feature includes injecting the GPS spoofing signal to analyze a safety device mechanism (GPS fail-safe) and a path-following algorithm of the target drone.

The analyzing of the drone feature includes identifying a path-following algorithm of the target drone based on a result of the observed movement direction by injecting the GPS spoofing signal for changing a GPS location of the target drone into the target drone to observe a movement direction of the target drone and identifying a safety device mechanism of the target drone by observing a flight mode of the target drone before and after activation of a safety device mechanism by the GPS spoofing signal and after an operation of a GPS receiver of the target drone is restored.

The hijacking of the target drone includes hijacking the target drone in the hijacking direction by generating the GPS spoofing signal based on the drone hijacking strategy corresponding to the analyzed drone feature, a measurement location of the target drone, and a predetermined hijacking direction to inject the GPS spoofing signal into the target drone.

When a flight mode is automatically changed to a hovering mode by using GPS after an operation of a GPS receiver of the target drone is restored by a safety device mechanism of the target drone, the hijacking of the target drone includes hijacking the target drone by injecting a hard GPS spoofing signal into the target drone to allow the GPS receiver to track the hard GPS spoofing signal and continuously manipulating the hard GPS spoofing signal such as moving in an opposite direction of a predetermined hijacking direction.

When an autonomous flight before the safety device mechanism is activated is performed again after an operation of a GPS receiver of the target drone is restored by a safety device mechanism of the target drone, the hijacking of the target drone includes hijacking the target drone by injecting a hard GPS spoofing signal into the target drone to allow the GPS receiver to track the hard GPS spoofing signal and continuously manipulating the hard GPS spoofing signal to allow the GPS receiver to recognize a target GPS location determined in consideration of a current location of the target drone, a path-following algorithm of the target drone, and an opposite direction of a predetermined hijacking direction.

When the safety device mechanism is maintained after an operation of a GPS receiver of the target drone is restored by a safety device mechanism of the target drone, the hijacking of the target drone includes hijacking the target drone by injecting a soft GPS spoofing signal into the target drone to allow tracking the soft GPS spoofing signal without interruption of the GPS receiver and continuously manipulating the soft GPS spoofing signal to allow recognizing a target GPS location determined in consideration of a current location of the target drone, a path-following algorithm of the target drone, and an opposite direction of a predetermined hijacking direction.

Furthermore, according to an embodiment of the inventive concept, an anti-drone method may further include disabling flight of the target drone through radio jamming when a location of the target drone is out of a predetermined protection zone.

According to an exemplary embodiment, an anti-drone method includes injecting a GPS spoofing signal into a target drone to analyze a drone feature including a safety device mechanism (GPS fail-safe) and a path-following algorithm of the target drone, selecting a drone hijacking strategy corresponding to a safety device mechanism and a path-following algorithm of the analyzed target drone among predefined drone hijacking strategies, and hijacking the target drone by injecting a GPS spoofing signal into the target drone based on the selected drone hijacking strategy.

The analyzing of the drone feature includes identifying a path-following algorithm of the target drone based on a result of the observed movement direction by injecting the GPS spoofing signal for changing a GPS location of the target drone into the target drone to observe a movement direction of the target drone and identifying a safety device mechanism of the target drone by observing a flight mode of the target drone before and after activation of a safety device mechanism by the GPS spoofing signal and after an operation of a GPS receiver of the target drone is restored.

According to an exemplary embodiment, an anti-drone system includes an analysis unit injecting a GPS spoofing signal to analyze a drone feature of a target drone and a control unit hijacking the target drone by injecting a GPS spoofing signal into the target drone based on a drone hijacking strategy corresponding to the analyzed drone feature among predefined drone hijacking strategies.

The analysis unit may inject the GPS spoofing signal to analyze a safety device mechanism (GPS fail-safe) and a path-following algorithm of the target drone.

The analysis unit may identify a path-following algorithm of the target drone based on a result of the observed movement direction by injecting the GPS spoofing signal for changing a GPS location of the target drone into the target drone to observe a movement direction of the target drone and identifies a safety device mechanism of the target drone by observing a flight mode of the target drone before and after activation of a safety device mechanism by the GPS spoofing signal and after an operation of a GPS receiver of the target drone is restored.

The control unit may hijack the target drone in the hijacking direction by generating the GPS spoofing signal based on the drone hijacking strategy corresponding to the analyzed drone feature, a measurement location of the target drone, and a predetermined hijacking direction to inject the GPS spoofing signal into the target drone.

When a flight mode is automatically changed to a hovering mode by using GPS after an operation of a GPS receiver of the target drone is restored by a safety device mechanism of the target drone, the control unit may hijack the target drone by injecting a hard GPS spoofing signal into the target drone to allow the GPS receiver to track the hard GPS spoofing signal and continuously manipulating the hard GPS spoofing signal such as moving in an opposite direction of a predetermined hijacking direction.

When an autonomous flight before the safety device mechanism is activated is performed again after an operation of a GPS receiver of the target drone is restored by a safety device mechanism of the target drone, the control unit may hijack the target drone by injecting a hard GPS spoofing signal into the target drone to allow the GPS receiver to track the hard GPS spoofing signal and continuously manipulating the hard GPS spoofing signal to allow the GPS receiver to recognize a target GPS location determined in consideration of a current location of the target drone, a path-following algorithm of the target drone, and an opposite direction of a predetermined hijacking direction.

When the safety device mechanism is maintained after an operation of a GPS receiver of the target drone is restored by a safety device mechanism of the target drone, the control unit may hijack the target drone by injecting a soft GPS spoofing signal into the target drone to allow tracking the soft GPS spoofing signal without interruption of the GPS receiver and continuously manipulating the soft GPS spoofing signal to allow recognizing a target GPS location determined in consideration of a current location of the target drone, a path-following algorithm of the target drone, and an opposite direction of a predetermined hijacking direction.

When a location of the target drone is out of a predetermined protection zone, the control unit may disable flight of the target drone through radio jamming.

According to an exemplary embodiment, an anti-drone method includes analyzing a drone feature of a target drone and hijacking the target drone by injecting a GPS spoofing signal into the target drone based on a drone hijacking strategy corresponding to the analyzed drone feature among predefined drone hijacking strategies.

According to an exemplary embodiment, an anti-drone method includes injecting a GPS spoofing signal to analyze a drone feature of a target drone and hijacking the target drone by injecting the GPS spoofing signal into the target drone in response to the analyzed drone feature.

According to an exemplary embodiment, it is possible to effectively hijack a dangerous drone in a specific zone, for example, an airport, a civilian residential area, or the like by injecting a GPS spoofing signal to analyze the feature of the drone and automatically generating a hijacking strategy based on the analysis result, thereby minimizing human, material and economic damages.

According to an exemplary embodiment, it is possible to effectively cope with the newly developed drone as well as the existing drone because the anti-drone method according to an embodiment of the inventive concept analyzes the feature of the drone to hijack the drone.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantage points and features of the inventive concept and a method of accomplishing thereof will become apparent from the following description with reference to the following figures, wherein embodiments will be described in detail with reference to the accompanying drawings. The inventive concept, however, may be embodied in various different forms, and should not be construed as being limited only to the illustrated embodiments. Rather, these embodiments are provided as examples so that the present disclosure will be thorough and complete, and will fully convey the concept of the inventive concept to those skilled in the art. The inventive concept may be defined by scope of the claims. Meanwhile, the terminology used herein to describe embodiments of the inventive concept is not intended to limit the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other components, steps, operations, and/or elements in addition to the aforementioned components, steps, operations, and/or elements.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings. The same reference numerals are used for the same components in the drawings and redundant explanations for the same components are omitted.

There is a facility where safety is not sufficiently ensured using only the conventional anti-drone system mainly using jamming. For example, in the case of a place where the terrorist attack using drone with explosives frequently occurs, because the drone stays in the protection zone even when the drone is disabled as soon as the drone is found, the damage may occur within the explosive radius. Moreover, in the case of an airport, the take-off and landing of all the planes are immediately forbidden in most airports when a drone flying in the airport is found. However, because the drone has no choice but to hover, the jamming of the conventional anti-drone system may not reduce the damage caused by the ban on the take-off and landing of all the planes.

Embodiments of the inventive concept are directed to inject a GPS spoofing signal to a target drone, for example, a dangerous drone invading a protection zone, to analyze the drone feature of the target drone, to inject the GPS spoofing signal to the target drone depending on selected hijacking strategy after selecting a drone hijacking strategy corresponding to the analyzed drone feature among drone hijacking strategies, which is built in advance depending on the drone feature, based on the analyzed drone feature, and to effectively hijack the dangerous drone, thereby minimizing human, material and economic damages.

Herein, the inventive concept may measure the location of the target drone by the GPS spoofing signal injected to the target drone, through a measurement means capable of detecting and identifying the target drone and measuring the location and may analyze the drone feature including the safety device mechanism (GPS fail-safe) and the path-following algorithm of the target drone through this measurement.

At this time, the inventive concept may identify a path-following algorithm of the target drone based on a result of the observed movement direction by injecting the GPS spoofing signal for changing a GPS location of the target drone to the target drone to observe a movement direction of the target drone and may identify a safety device mechanism of the target drone by observing a flight mode of the target drone before and after activation of a safety device mechanism by the GPS spoofing signal and after an operation of a GPS receiver of the target drone is restored.

Furthermore, the inventive concept may perform classification into three types of drones depending on a drone feature, may observe or measure the location, the movement direction, the flight mode, or the like of a dangerous drone by generating a GPS spoofing signal to inject a dangerous drone when a dangerous drone is detected within a protection zone after building a drone hijacking algorithm according to each of the classified types of drones in database (DB) in advance, may identify a type of the dangerous drone by analyzing the drone feature of the dangerous drone based on the observation result of the dangerous drone, and may perform the drone hijacking algorithm according to the identified type of the dangerous drone to stably induce the dangerous drone in a predetermined hijacking direction.

Accordingly, the system of the inventive concept may include a means that identifies the safety device mechanism (GPS fail-safe) and the path-following algorithm of a drone in a manner of injecting a GPS spoofing signal, for example, a drone feature analyzing module and a means that formulates a drone hijacking strategy suitable for the analysis result, for example, a drone hijacking strategy generating module.

That is, the inventive concept induces the drone to move safely in the desired direction without sudden direction change in an emergency in the manner of faking the location of the drone through the GPS spoofing signal. An attack scheme that causes the drone to mistake the location of the drone through the GPS spoofing signal to deviate from the specified location or path has been known through the conventional study. However, such the attack scheme is limited to be used as an anti-drone technology due to the lack of accuracy and stability of the drone movement direction. However, the inventive concept may secure the accuracy and stability by determining the fake GPS location suitable for the feature of the drone.

GPS is a satellite-based navigation system in which dozens of GPS satellites provide location and time information to the GPS receiver of the ground via RF signals while orbiting the earth. The GPS receiver may estimate the geographic location based on satellite coordinates and the distance between each GPS satellite and a receiver. Each GPS satellite transmits a coarse acquisition (C/A) code signal used by civilians and a P(Y) code signal, which may be used for only military purposes.

A civil GPS receiver processes the C/A code GPS signals in several steps. First, the code phase indicating the coarse Doppler frequency shift and a place, where the C/A code is started, is determined. This step is called "acquisition". Next, the frequency shift and code phase, which change with time, are tracked. Accordingly, the GPS receiver may continuously track the signal despite the multipath and Doppler effects caused by the movement of the GPS satellite and the receiver. The GPS receiver extracts a navigation data bit and measures a pseudorange that is a distance measurement including latency and clock errors while tracking the signal. Then, the receiver estimates the location, speed, and time, using the navigation data and the pseudorange. In the case of signal interruption or signal loss, the receiver loses the lock and then resumes an operation in the acquisition step.

The P(Y) code signal is encrypted for military purposes; on the other hand, the C/A code signal used by civilians is not encrypted or authenticated. Accordingly, civil GPS receivers are vulnerable to GPS spoofing. When the GPS spoofing signal is strong enough to cover the real signal, the GPS receiver is locked by the spoofing signal. The GPS spoofing is classified as "soft" or "hard" depending on whether it is locked smoothly without the interruption of the GPS spoofing signal. Herein, soft GPS spoofing and hard GPS spoofing are technical details known to those skilled in the art, and thus the detailed descriptions are omitted.

The inventive concept provides an anti-drone technology for a target drone using a GPS spoofing signal; the inventive concept will be described below.

Figure 1:
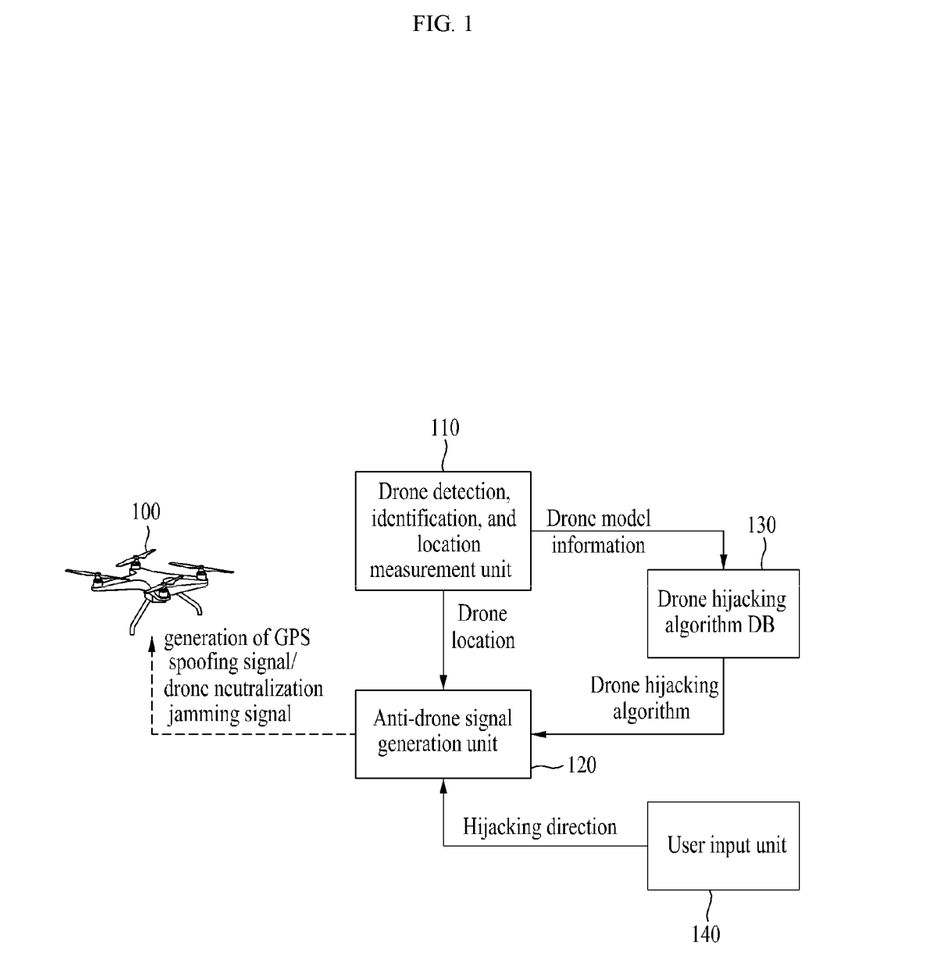
FIG. 1 illustrates an exemplary view for describing an anti-drone system, according to an embodiment of the inventive concept.

FIG. 1 illustrates an exemplary view for describing an anti-drone system, according to an embodiment of the inventive concept.

As illustrated in FIG. 1, the anti-drone system includes a drone detection, identification, and location measurement unit 110, an anti-drone signal generation unit 120, a drone hijacking algorithm DB 130, and a user input unit 140.

The measurement unit 110 detects a target drone 100 invading the protection zone, identifies the target drone 100, and measures the location of the target drone 100 within the protection zone.

At this time, the measurement unit 110 may extract the model information of the target drone by detecting and identifying the target drone 100 and may analyze the drone feature of the target drone 100 by analyzing the location change of the target drone, the movement direction, the flight mode of the target drone before and after the activation of a safety device mechanism and after the operation of the GPS receiver of the target drone is restored, as the GPS spoofing signal generated by the anti-drone signal generation unit 120 is injected to the target drone.

Herein, the measurement unit 110 may perform drone intrusion detection, drone model identification, drone manufacturer identification, drone location measurement, or the like, such as DroneShield's DroneSentry or Dedrone's DroneTracker, through various sensors such as a radar, a camera, a microphone, an optical sensor, an RF detector, an infrared sensor, and the like.

Such the measurement unit 110 may obtain drone model information through the drone intrusion detection, the drone model identification, the drone location measurement, or the like and may obtain a drone hijacking algorithm suitable for the drone model information from a DB. Of course, the inventive concept may analyze the drone feature of the target drone, for example, the safety device mechanism (GPS fail-safe) and the path-following algorithm, based on the data measured through the measurement unit and may obtain the drone hijacking algorithm suitable for the analyzed drone feature from the DB.

The anti-drone signal generation unit 120 may generate a GPS spoofing signal and then may inject the GPS spoofing signal into the target drone to grasp the drone feature of the target drone 100 and may properly generate the GPS spoofing signal based on the drone hijacking algorithm of the target drone obtained from the DB, the hijacking direction or hijacking location entered by a user through the user input unit 140, and the current drone location measured by the measurement unit to inject the GPS spoofing signal to the target drone; accordingly, the anti-drone signal generation unit 120 may accurately and reliably hijack the target drone 100 in the hijacking direction.

Herein, when it is determined that the target drone 100 is out of the protection zone, the anti-drone signal generation unit 120 may disable the target drone by generating a jamming signal capable of disabling the target drone and transmitting the jamming signal to the target drone. Of course, the anti-drone signal generation unit 120 is not limited to generating the jamming signal; it is also possible to disable the target drone, using all kinds of the applicable drone flight neutralization signals or drone flight neutralization methods that are capable of neutralizing the target drone. Furthermore, the inventive concept includes an RC jammer, and may interfere with the remote control signal of the target drone, using the RC jammer.

Figure 2:
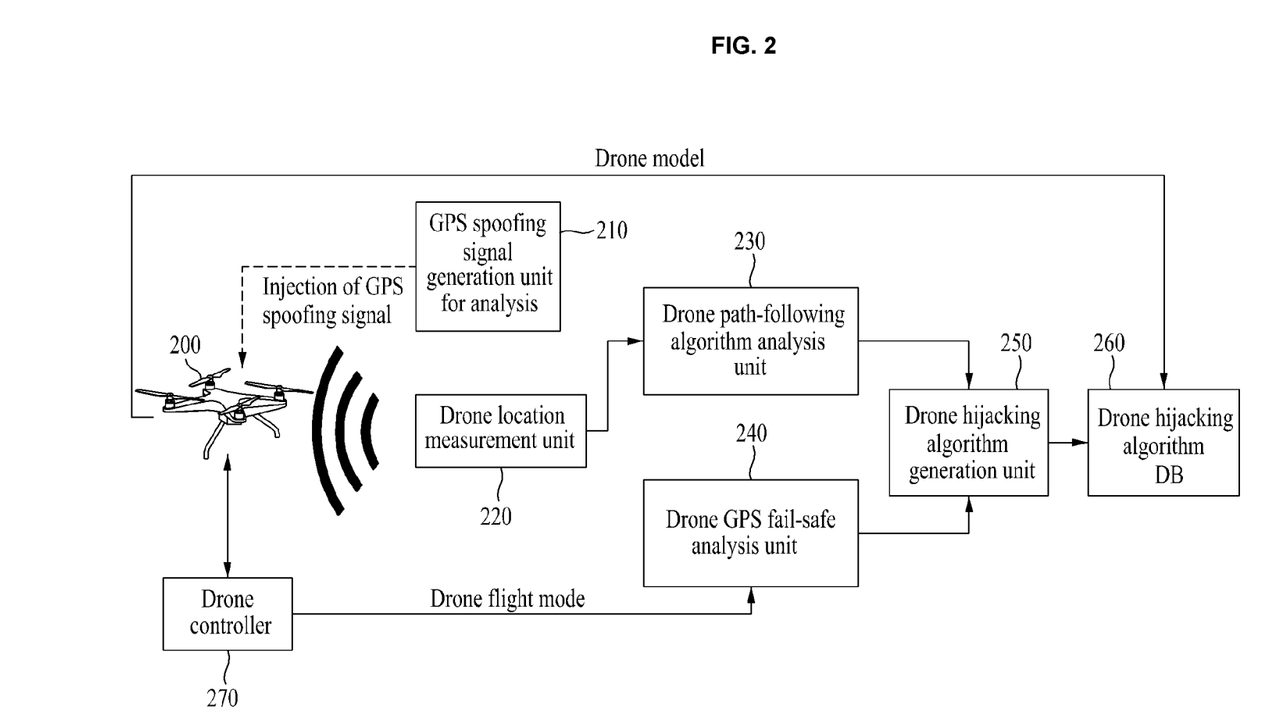
FIG. 2 illustrates an exemplary view for describing a process of building a drone hijacking algorithm.

FIG. 2 illustrates an exemplary view for describing a process of building a drone hijacking algorithm; FIG. 2 illustrates an exemplary view of a conceptual diagram of a method for building a drone hijacking algorithm DB.

As illustrated in FIG. 2, a system building a drone hijacking algorithm includes an analysis unit analyzing a drone feature and a generation unit generating a drone hijacking algorithm.

The analysis unit analyzing the drone feature includes a drone path-following algorithm analysis unit 230 analyzing the path-following algorithm of the target drone and a drone safety device mechanism analysis unit 240 analyzing the safety device mechanism of a drone.

The drone path-following algorithm analysis unit 230 identifies which path-following algorithm a target drone 200 uses by changing the GPS location of the target drone 200 to various locations through a GPS spoofing signal generation unit 210 and analyzing the result of observing the movement direction of the drone through a drone location measurement unit 220. Herein, the path-following algorithm identified by the drone path-following algorithm analysis unit 230 may be used to determine the GPS location to be manipulated when performing the hijacking of the dangerous drone that invades the protection zone.

The drone safety device mechanism analysis unit 240 analyzes the safety device mechanism of the target drone by observing how the flight mode of the target drone changes before and after the safety device mechanism (GPS fail-safe) is activated by the GPS spoofing signal through a drone controller 270 and at the moment when the operation of the GPS receiver of the target drone is restored again.

Herein, the drone safety device mechanism may be largely divided into three types. The first type is a type in which the flight mode is automatically changed to the hovering mode using GPS after the operation of the GPS receiver is restored; the second type is a type in which the original flight mode before the safety device mechanism is activated is resumed after the operation of the GPS receiver is restored; and the third type is a type in which the flight mode of the safety device mechanism is maintained even when the operation of the GPS receiver is restored.

A drone hijacking algorithm generation unit 250 generates the drone hijacking algorithm for safely hijacking the target drone based on the drone feature including the path-following algorithm and the safety device mechanism analyzed with respect to the target drone 200 and maps the hijacking algorithm for the generated target drone to the model of the target drone to store the mapped result in a drone hijacking algorithm DB 260.

Herein, the drone hijacking algorithm generation unit 250 may map and store the model of the target drone with the drone hijacking algorithm, but is not limited thereto. The drone hijacking algorithm generation unit 230 may map and store the drone feature to the drone hijacking algorithm. For example, the drone hijacking algorithm generation unit 250 may map at least one of the drone feature and the drone model to the drone hijacking algorithm to store the mapped result in the drone hijacking algorithm DB 260 by grasping the path-following algorithm analyzed for the target drone and any type of safety device mechanisms among the three types and generating a drone hijacking algorithm considering the hijacking direction to be entered by the user.

Through this process, the drone hijacking algorithm DB 260 of the inventive concept may be built; when a dangerous drone is detected that enters a protection zone, for example, an airport, residential area, or the like, the drone hijacking algorithm DB thus constructed may perform the drone hijacking algorithm corresponding to the drone feature, and may safely and accurately hijack the dangerous drone in the hijacking direction, by analyzing the drone feature of the dangerous drone. Of course, for the purpose of moving the dangerous drone in the hijacking direction, the inventive concept may hijack the dangerous drone by generating a GPS spoofing signal to be manipulated in consideration of the drone hijacking algorithm and the current location of the dangerous drone and injecting the generated GPS spoofing signal into the dangerous drone.

Figure 3:
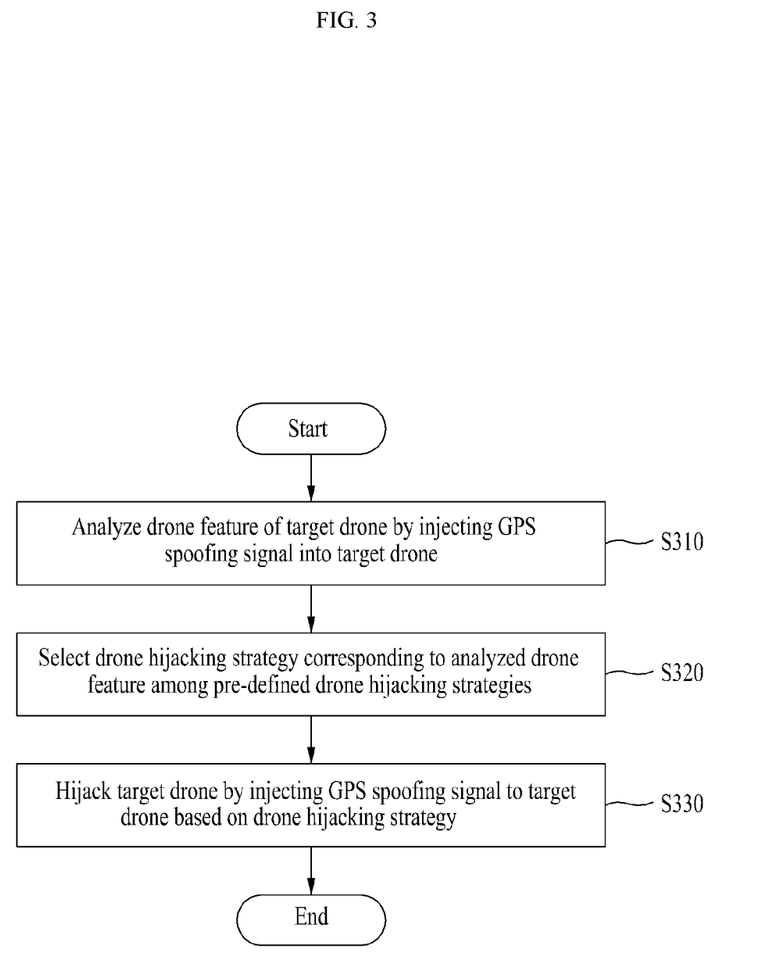
FIG. 3 illustrates an operation flowchart for an anti-drone method, according to an embodiment of the inventive concept.

FIG. 3 illustrates an operation flowchart for an anti-drone method, according to an embodiment of the inventive concept.

Referring to FIG. 3, when a drone is detected in a specific zone, for example, a protection zone, in operation S310, the anti-drone method according to an embodiment of the inventive concept analyzes the drone feature of the target drone by injecting a GPS spoofing signal into the target drone.

Herein, operation S310 may analyze the drone feature of the target drone by injecting a GPS spoofing signal and analyzing the safety device mechanism and the path-following algorithm of the target drone. For example, operation S310 may identify (or analyze) a path-following algorithm of the target drone based on a result of the observed movement direction by injecting the GPS spoofing signal for changing a GPS location of the target drone to the target drone to observe a movement direction of the target drone and may identify a safety device mechanism of the target drone by observing a flight mode of the target drone before and after activation of a safety device mechanism by the GPS spoofing signal and after an operation of a GPS receiver of the target drone is restored.

When the drone feature of the target drone is analyzed by operation S310, in operation S320, a drone hijacking strategy corresponding to the analyzed drone feature among the drone hijacking strategies (or the drone hijacking algorithms) stored in the database is selected.

Herein, in operation S320, the drone model of the target drone may be detected using a variety of sensors; when the drone model is detected, a drone hijacking strategy corresponding to the drone model may be selected.

When the drone hijacking strategy corresponding to the target drone is selected by operation S320, in operation S330, the target drone is hijacked in a hijacking direction, which is predetermined or entered by the user, by injecting the GPS spoofing signal generated based on the selected drone hijacking strategy to the target drone invading the protection zone, that is, transmitting the GPS spoofing signal to the target drone.

Herein, operation S330 may hijack the target drone in the hijacking direction by generating a GPS spoofing signal including the drone hijacking strategy corresponding to the drone feature of the target drone, the measurement location of the target drone, and a GPS location, which is manipulated based on the hijacking direction predetermined or entered by the user, to inject the GPS spoofing signal to the target drone.

Furthermore, the method according to the inventive concept may determine whether the target drone to be hijacked is out of the predetermined protection zone, by measuring the current location of the target drone and may disable the flight of the target drone through radio jamming or the like when it is determined that the target drone is out of the protection zone. Herein, the method according to the inventive concept may disable the target drone, using all applicable kinds of drone flight neutralization signals or drone flight neutralization methods as well as disabling the drone through the radio jamming.

In the inventive concept, the method in which the GPS spoofing signal manipulates a location refers to a method of making the mistake that the Doppler frequency and the code phase are changed because the GPS receiver receiving the corresponding signal is moving while appropriately changing the Doppler frequency and a code phase of the signal.

At this time, in the inventive concept, the structures of the drone hijacking algorithm that hijacks the target drone may be different depending on the three types of safety device mechanisms, and this will be described with reference to FIGS. 4 to 6.

Figure 4:
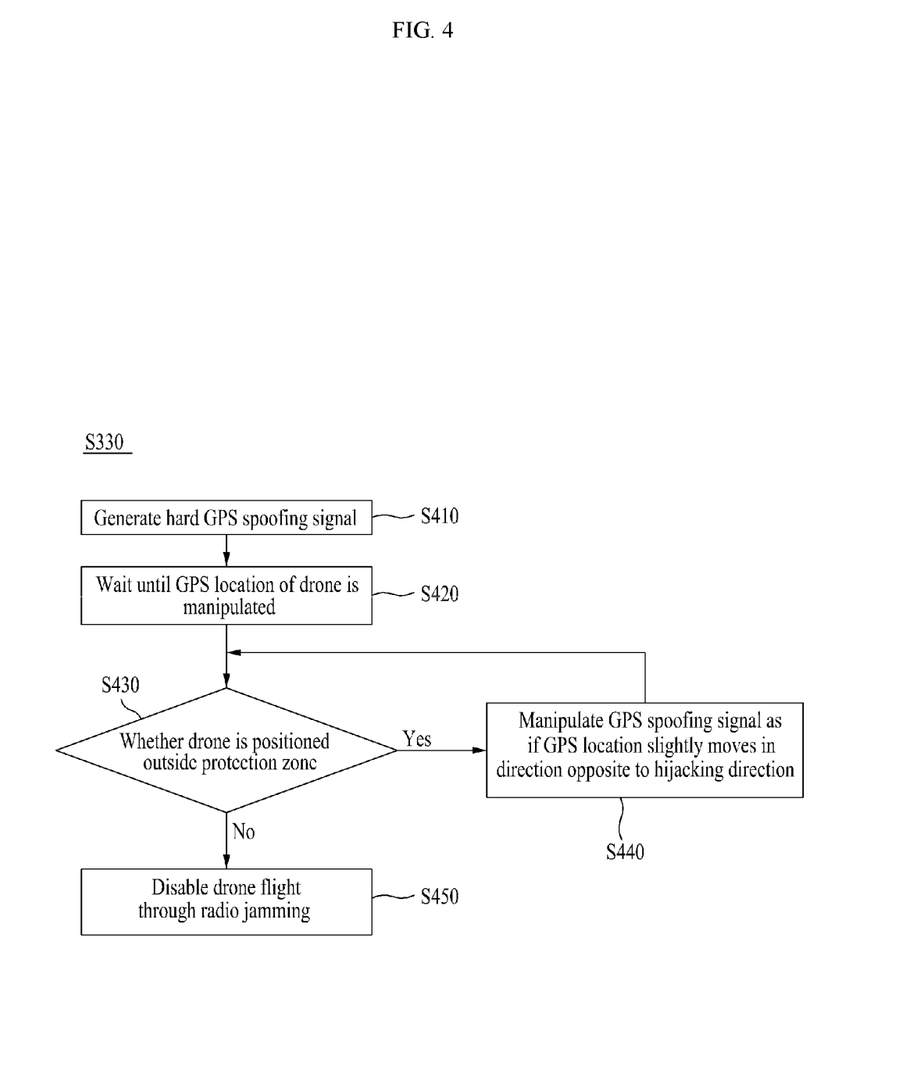
FIG. 4 illustrates an operation flowchart of an embodiment of operation S330 of FIG. 3.

FIG. 4 illustrates an operation flowchart of an embodiment of operation S330 of FIG. 3 and illustrates an operation flowchart for a drone hijacking algorithm for a drone having a first type of safety device mechanism.

As illustrated in FIG. 4, in operation S330 of hijacking the target drone, the first type of the target drone maintains hovering, using GPS when the operation of the GPS receiver is restored. Accordingly, the drone is hijacked in the method of inducing the drone to accelerate in the drone hijacking direction to stay in place by misleading the drone through a GPS spoofing signal as if the drone is moving in the opposite direction of the drone hijacking direction. To this end, operation S330 generates a hard GPS spoofing signal and injects the hard GPS spoofing signal into the target drone because the safety device mechanism needs to be activated.

Herein, the soft GPS spoofing signal is a signal that is generated as closely as possible to the current actual GPS signal such that the GPS receiver seamlessly calculates the manipulated location; because the soft GPS spoofing signal needs to be matched with the physical location, GPS system time, and GPS message content of the GPS receiver, the generation of the soft GPS spoofing signal is more difficult than the generation of the hard GPS spoofing signal; accordingly, in the case of the first type, operation S410 generates and injects a hard GPS spoofing signal.

When the hard GPS spoofing signal is injected by operation S410, in operation S420, it waits until the GPS location is manipulated by the hard GPS spoofing signal because it takes some time for the GPS receiver to calculate the manipulated GPS location using a hard GPS spoofing signal. This may be measured when the safety device mechanism is analyzed to build a drone hijacking algorithm.

In operation S430 and operation S440, it manipulates the target drone as if the GPS location of the target drone continues to move in the opposite direction of the hijacking direction, by continuously manipulating the GPS spoofing signal using the drone hijacking algorithm as if the GPS location moves in the opposite direction of the hijacking direction until a drone goes out of the protection zone when the measured time or more has elapsed. That is, the target drone is hijacked by injecting a hard GPS spoofing signal into the target drone to allow the GPS receiver to track the hard GPS spoofing signal and continuously manipulating the hard GPS spoofing signal, such as moving in the direction opposite to the predetermined hijacking direction.

In operation S450, the drone flight neutralization is attempted through radio jamming when the drone goes out of the protection zone through this process.

Figure 5:
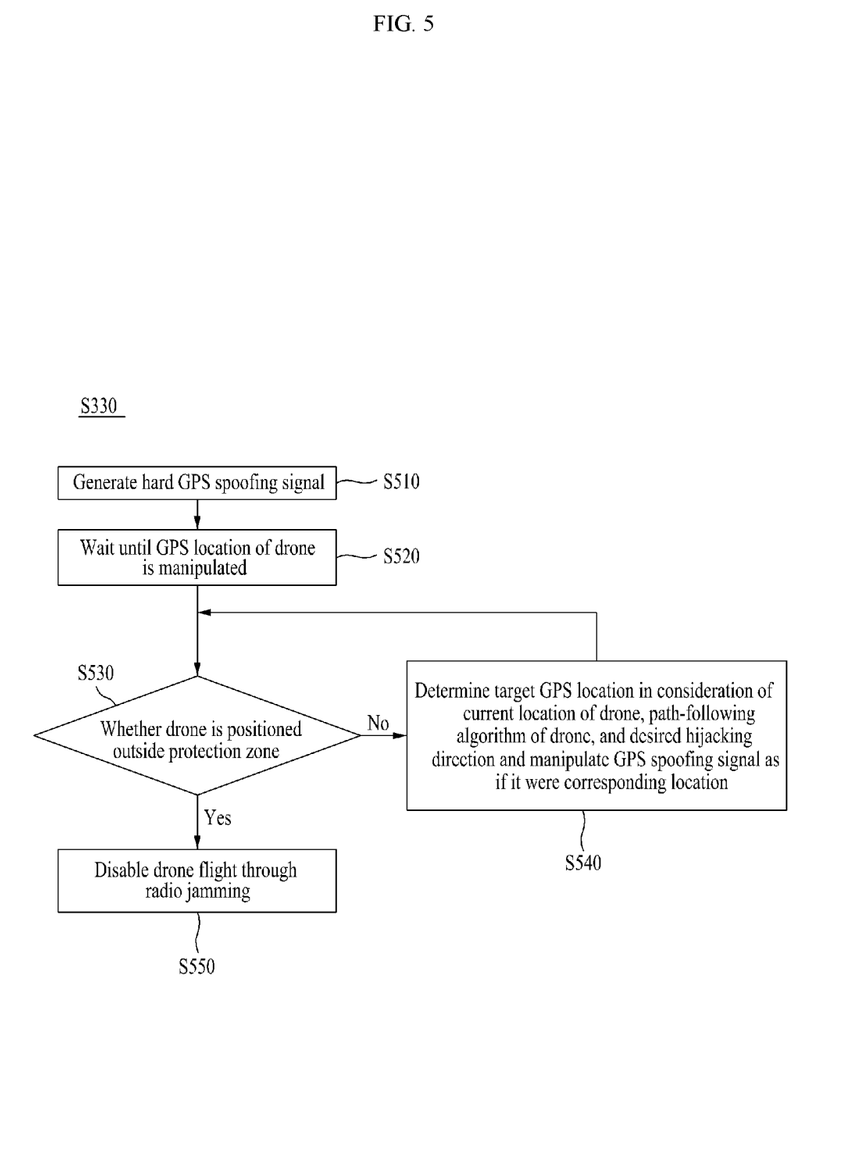
FIG. 5 illustrates an operation flowchart of another embodiment of operation S330 of FIG. 3.

FIG. 5 illustrates an operation flowchart of another embodiment of operation S330 of FIG. 3 and illustrates an operation flowchart for a drone hijacking algorithm for a drone having a second type of safety device mechanism.

As illustrated in FIG. 5, in operation S330 of hijacking the target drone, the second type of the target drone resumes an autonomous flight before the safety device mechanism is activated when the operation of the GPS receiver is restored. Accordingly, even though the target drone deviates from the path by the path-following algorithm, the target drone is made to mistake that the target drone deviates from the path, through the GPS spoofing signal using the property that the target drone is trying to return to path. At this time, the drone may be hijacked in the desired direction when the GPS manipulation location is well determined; the GPS manipulation location may be determined by identifying the current location of the target drone and the desired hijacking direction in addition to the path-following algorithm.

To this end, operation S510 generates a hard GPS spoofing signal and injects the hard GPS spoofing signal (spoofing signal) into the target drone because the safety device mechanism needs to be activated in operation 330.

When the hard GPS spoofing signal is injected by operation S510, in operation S520, it waits until the GPS location is manipulated by the hard GPS spoofing signal because it takes some time for the GPS receiver to calculate the manipulated GPS location using a hard GPS spoofing signal. This may be measured when the safety device mechanism is analyzed to build a drone hijacking algorithm.

In operation S530 and operation S540, the GPS location is determined in consideration of the current location of the target drone, the path-following algorithm of the target drone, and the desired hijacking direction, using the drone hijacking algorithm until the drone goes out of the protection zone when the measured time or more has elapsed; the target drone is manipulated as if the target drone deviates from the path by continuously manipulating the hard GPS spoofing signal as if it were a determined GPS location; in this way, the target drone is hijacked in the hijacking direction. That is, the target drone is hijacked by injecting a hard GPS spoofing signal into the target drone to allow the GPS receiver to track the hard GPS spoofing signal and continuously manipulating the hard GPS spoofing signal to allow the GPS receiver to recognize a target GPS location determined in consideration of a current location of the target drone, a path-following algorithm of the target drone, and an opposite direction of a predetermined hijacking direction.

In operation S550, the drone flight neutralization is attempted through radio jamming when the drone goes out of the protection zone through this process.

Figure 6:
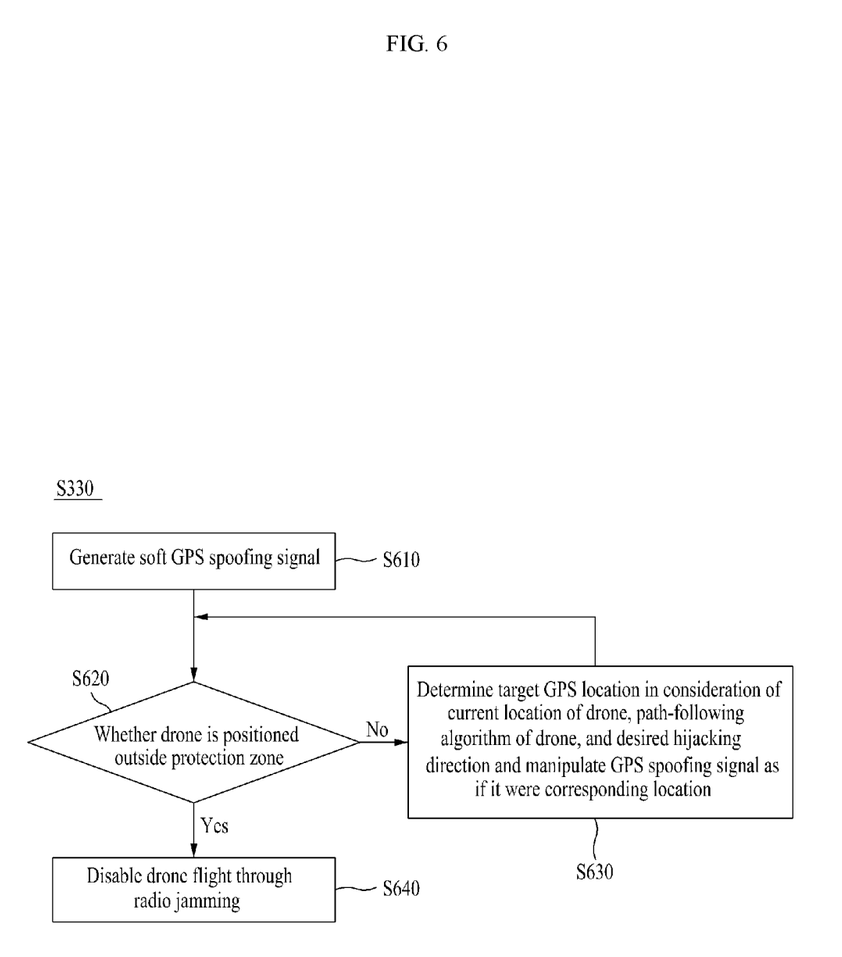
FIG. 6 illustrates an operation flowchart of still another embodiment of operation S330 of FIG. 3.

FIG. 6 illustrates an operation flowchart of still another embodiment of operation S330 of FIG. 3 and illustrates an operation flowchart for a drone hijacking algorithm for a drone having a third type of safety device mechanism.

As illustrated in FIG. 6, in operation S330 of hijacking a target drone, the third type of the target drone maintains the safety device mechanism when the safety device mechanism is activated once even though the operation of the GPS receiver is restored. Accordingly, when the safety device mechanism is activated once, because the GPS spoofing signal no longer affects the drone, the corresponding type of drone may be hijacked using a GPS spoofing signal only when the safety device mechanism is not activated. That is, because the third type of target drone is not activated by the safety device mechanism by the soft GPS spoofing signal and is locked by the soft GPS spoofing signal, the third type of target drone may properly move the GPS location by the spoofing signal.

To this end, in operation 610, operation S330 manipulates the GPS location without the interruption of the operation of the GPS receiver, by generating the soft GPS spoofing signal to inject the soft GPS spoofing signal into the target drone. At this time, even though the third type of target drone deviates from the path by the path-following algorithm, the target drone is made to mistake that the target drone deviates from the path, through the GPS spoofing signal using the property that the target drone is trying to return to path. Herein, the GPS manipulation location may be determined by the path-following algorithm of the target drone, the current location of the target drone, and the desired hijacking direction.

Then, in operation S620 and operation S630, the GPS location is determined in consideration of the current location of the target drone, the path-following algorithm of the target drone, and the desired hijacking direction, using the drone hijacking algorithm until the target drone goes out of the protection zone; the target drone is manipulated as if the target drone deviates from the path by continuously manipulating the hard GPS spoofing signal as if it were a determined GPS location; in this way, the target drone is hijacked in the hijacking direction. That is, the target drone is hijacked by injecting a soft GPS spoofing signal into the target drone to allow tracking the soft GPS spoofing signal without interruption of the GPS receiver and continuously manipulating the soft GPS spoofing signal to allow recognizing a target GPS location determined in consideration of a current location of the target drone, a path-following algorithm of the target drone, and an opposite direction of a predetermined hijacking direction.

In operation S640, the drone flight neutralization is attempted through radio jamming when the drone goes out of the protection zone through this process.

The third type of target drone slowly moves the location to the target GPS manipulation location because the safety device mechanism may be activated even when the GPS location is drastically changed. While the target drone is moving the GPS location to the targeted GPS manipulation location, the target drone may move in a direction slightly different from the hijacking direction. However, when the movement is complete, the target drone may be hijacked in the correct direction. Because some safety device mechanisms tolerate rapid changes in the GPS location during short periods of time, in this case, the GPS location is allowed to be manipulated to the desired location at once. However, because the safety device mechanism may also be activated when the actual movement of a drone differs from the movement on GPS while the drone is being hijacked, in this case, the activation of the safety device mechanism needs to be prevented in a method of moving a GPS location in response to the movement of the drone.

Even though the drone hijacking algorithm of FIG. 6 is described as a drone hijacking algorithm for a drone having the third type of safety device mechanism but is not limited thereto. The drone hijacking algorithm of FIG. 6 may be applied as the drone hijacking algorithm for the drone having the first type of safety device mechanism and the drone having the second type of safety device mechanism. That is, the drone hijacking algorithm of FIGS. 4 and 6 may be applied to the drone having the first type of safety device mechanism; the drone hijacking algorithm of FIGS. 5 and 6 may be applied to the drone having the second type of safety device mechanism.

As such, the anti-drone method according to an embodiment of the inventive concept may effectively hijack a dangerous drone in a protection zone, for example, an airport and a civilian residential area, by injecting the GPS spoofing signal (or spoofing signal) to analyze the feature of the drone and automatically generating a hijacking strategy (or drone hijacking algorithm) based on the analysis result, thereby minimizing human, material and economic damages.

Moreover, because the anti-drone method according to an embodiment of the inventive concept analyzes the feature of the drone to hijack the drone, the anti-drone method may effectively cope with the newly developed drone as well as the existing drone.

Furthermore, because the safety device mechanism of the third type of drone may be activated in the process of analyzing the safety device mechanism of a drone to fail to hijack the target drone, the anti-drone method according to an embodiment of the inventive concept may hijack the target drone using the following method. For example, the anti-drone method according to an embodiment of the inventive concept may grasp or analyze the path-following algorithm of the target drone, using a soft GPS spoofing signal and may hijack the target drone, using the grasped path-following algorithm of the target drone and the drone hijacking algorithm described in FIG. 6.

Also, the anti-drone method according to an embodiment of the inventive concept may not be limited to reading out the drone hijacking algorithm from the DB; when a variety of drone hijacking algorithms is included in the running software and the drone model, the safety device mechanism, or a path-following algorithm is identified, the anti-drone method may also hijack the target drone to the location or direction desired by a user, by calling a function including the corresponding algorithm. Of course, such software may be updated.

In addition, because the drone manufacturers disclose the source code or the internal operating principle in the case of some drones, the anti-drone method according to another embodiment of the inventive concept may grasp the feature of the drone without the injection of the GPS spoofing signal; the feature of the drone may be stored in the DB or in the form of a function. That is, the anti-drone method according to still another embodiment of the inventive concept may hijack the target drone by injecting the GPS spoofing signal into the target drone based on the drone hijacking strategy corresponding to the analyzed drone feature among predefined drone hijacking strategies after analyzing the drone feature of the target drone.

In addition, the anti-drone method according to yet another embodiment of the inventive concept may hijack the target drone by injecting a GPS spoofing signal to the target drone in response to the analyzed feature of the drone through injecting the GPS spoofing signal in a state of not defining a hijacking strategy in advance.

Figure 7:
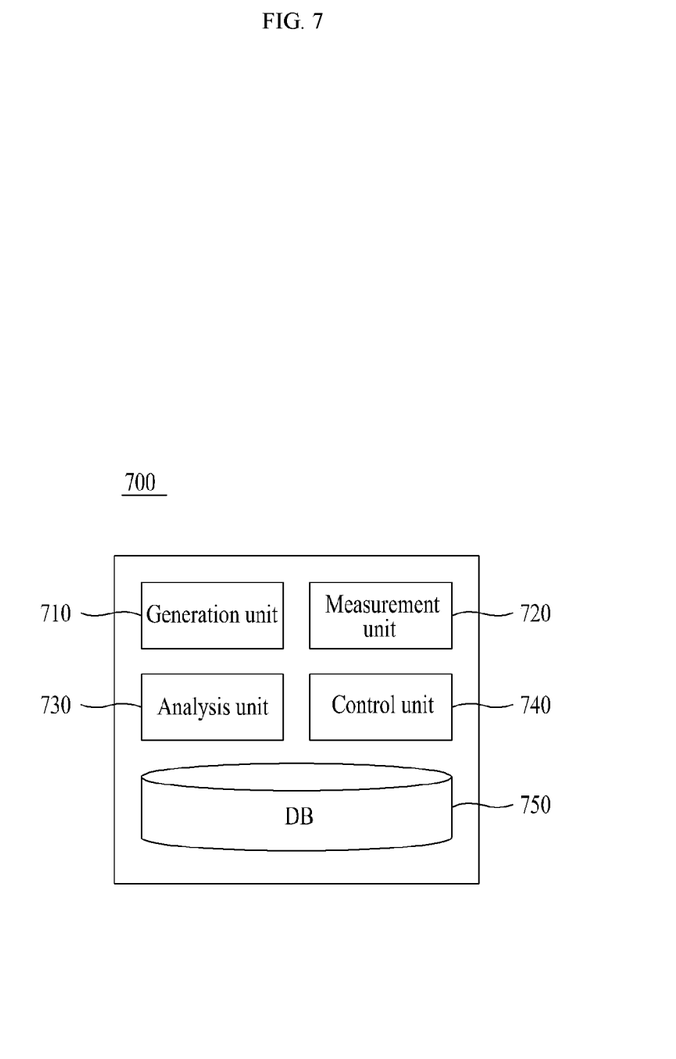
FIG. 7 illustrates a conceptual configuration for an anti-drone system, according to an embodiment of the inventive concept.

FIG. 7 illustrates a conceptual configuration for an anti-drone system, according to an embodiment of the inventive concept and illustrates a configuration of a system performing the FIGS. 1 to 7.

Referring to FIG. 7, an anti-drone system 700 according to an embodiment of the inventive concept includes a generation unit 710, a measurement unit 720, an analysis unit 730, a control unit 740, and a database (DB) 750.

The DB 750 stores various pieces of data and algorithms associated with the inventive concept and stores all pieces of information associated with the inventive concept, such as drone model information, a safety device mechanism, a path-following algorithm, drone hijacking algorithms according to drone feature, or the like.

The generation unit 710 generates a GPS spoofing signal to be injected into the target drone and generates a jamming signal as needed.

Herein, the generation unit 710 may generate and transmit the GPS spoofing signal including a GPS location manipulated by the drone hijacking algorithm of the target drone.

The measurement unit 720 detects or measures information about the target drone, using various sensors such as the intrusion detection of the target drone, the model identification of the target drone, the identification of the manufacturer of the target drone, and the location measurement of the target drone.

When a drone is detected in a specific zone, for example, a protection zone, the analysis unit 730 analyzes the drone feature of the target drone by injecting a GPS spoofing signal into the target drone.

Herein, the analysis unit 730 may analyze the drone feature of the target drone by injecting a GPS spoofing signal and analyzing the safety device mechanism and the path-following algorithm of the target drone. For example, the analysis unit 730 may identify (or analyze) a path-following algorithm of the target drone based on a result of the observed movement direction by injecting the GPS spoofing signal for changing a GPS location of the target drone to the target drone to observe a movement direction of the target drone and may identify a safety device mechanism of the target drone by observing a flight mode of the target drone before and after activation of a safety device mechanism by the GPS spoofing signal and after an operation of a GPS receiver of the target drone is restored.

When the drone feature of the target drone is analyzed by the analysis unit 730, the control unit 740 hijacks the target drone in a hijacking direction, which is predetermined or entered by the user, by selecting a drone hijacking strategy corresponding to the analyzed drone feature among drone hijacking strategies (or drone hijacking algorithms) pre-stored in the drone hijacking algorithm DB and injecting the GPS spoofing signal generated based on the selected drone hijacking strategy into the target drone invading a protection zone.

Herein, the control unit 740 may hijack the target drone in the hijacking direction by generating a GPS spoofing signal including the drone hijacking strategy corresponding to the drone feature of the target drone, the measurement location of the target drone, and a GPS location, which is manipulated based on the hijacking direction predetermined or entered by the user, to inject the GPS spoofing signal to the target drone.

Furthermore, the control unit 740 may determine whether the target drone to be hijacked is out of the predetermined protection zone, by measuring the current location of the target drone and may disable the flight of the target drone through radio jamming or the like when it is determined that the target drone is out of the protection zone.

At this time, the control unit 740 may apply a drone hijacking algorithm differently depending on the type of target drone.

For example, when a flight mode is automatically changed to a hovering mode by using GPS after an operation of a GPS receiver of the target drone is restored by a safety device mechanism of the target drone, the control unit 740 may hijack the target drone by injecting a hard GPS spoofing signal into the target drone to manipulate the GPS location of a GPS receiver and continuously manipulating the GPS spoofing signal such as moving in an opposite direction of the predetermined hijacking direction.

For another example, when an autonomous flight before the safety device mechanism is activated is performed again after an operation of a GPS receiver of the target drone is restored by a safety device mechanism of the target drone, the control unit 740 may hijack the target drone by injecting a hard GPS spoofing signal into the target drone to manipulate the GPS location of the GPS receiver and continuously manipulating the hard GPS spoofing signal to recognize the target GPS location set by the current location of the target drone, the path-following algorithm of the target drone, and the opposite direction of the predetermined hijacking direction.

For still another example, when the safety device mechanism is maintained after an operation of a GPS receiver of the target drone is restored by a safety device mechanism of the target drone, the control unit 740 may hijack the target drone by injecting a soft GPS spoofing signal into the target drone to manipulate the GPS location without interrupting the operation of the GPS receiver and continuously manipulating the soft GPS spoofing signal to recognize the target GPS location set by the current location of the target drone, the path-following algorithm of the target drone, and the opposite direction of the predetermined hijacking direction.

Even though the description in the system in FIG. 7 is omitted, it will be apparent to those skilled in the art that the configuration means constituting FIG. 7 may include all content described in FIGS. 1 to 6.

The foregoing devices may be realized by hardware elements, software elements and/or combinations thereof. For example, the devices and components described in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be embodied in any type of machine, components, physical equipment, virtual equipment, computer storage media or devices so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The computer-readable medium may also include the program instructions, data files, data structures, or a combination thereof. The program instructions recorded in the media may be designed and configured specially for the exemplary embodiments of the inventive concept or be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer instructions include not only machine language codes created by a compiler, but also high-level language codes that are capable of being executed by a computer by using an interpreter or the like.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An anti-drone method, the method comprising:
    injecting a first GPS spoofing signal into a target drone;
    observing a behavior of the target drone in response to the first GPS spoofing signal;
    identifying and analyzing a feature of the target drone based on the behavior of the target drone, wherein a feature comprises a safety device mechanism or a path-following algorithm;
    selecting a drone hijacking strategy from a database of predefined drone hijacking strategies based on the feature, and
    hijacking the target drone by injecting a second GPS spoofing signal into the target drone based on the drone hijacking strategy corresponding to the analyzed drone feature among the predefined drone hijacking strategies.

2. The method of claim 1, wherein the analyzing of the drone feature includes:
    injecting the first GPS spoofing signal to analyze the safety device mechanism (GPS fail-safe) and the path-following algorithm of the target drone.

3. The method of claim 1, wherein the analyzing of the drone feature includes:
    by injecting the first GPS spoofing signal for changing a GPS location of the target drone into the target drone to observe a movement direction of the target drone, identifying the path-following algorithm of the target drone based on a result of the observed movement direction; and
    by observing a flight mode of the target drone before and after activation of a safety device mechanism by the first GPS spoofing signal and after an operation of a GPS receiver of the target drone is restored, identifying the safety device mechanism of the target drone.

4. The method of claim 1, wherein the hijacking of the target drone includes:
    by generating the second GPS spoofing signal based on the drone hijacking strategy corresponding to the analyzed drone feature, a measurement location of the target drone, and a predetermined hijacking direction to inject the second GPS spoofing signal into the target drone, hijacking the target drone in the hijacking direction.

5. The method of claim 1, wherein the hijacking of the target drone includes:
    when a flight mode is automatically changed to a hovering mode by using GPS after an operation of a GPS receiver of the target drone is restored by the safety device mechanism of the target drone,
    by injecting a hard GPS spoofing signal into the target drone to allow the GPS receiver to track the hard GPS spoofing signal and continuously manipulating the hard GPS spoofing signal such as moving in an opposite direction of a predetermined hijacking direction, hijacking the target drone.

6. The method of claim 1, wherein the hijacking of the target drone includes:
    when an autonomous flight before the safety device mechanism is activated is performed again after an operation of a GPS receiver of the target drone is restored by the safety device mechanism of the target drone,
    by injecting a hard GPS spoofing signal into the target drone to allow the GPS receiver to track the hard GPS spoofing signal and continuously manipulating the hard GPS spoofing signal to allow the GPS receiver to recognize a target GPS location determined in consideration of a current location of the target drone, a path-following algorithm of the target drone, and an opposite direction of a predetermined hijacking direction, hijacking the target drone.

7. The method of claim 1, wherein the hijacking of the target drone includes:
    when the safety device mechanism is maintained after an operation of a GPS receiver of the target drone is restored by the safety device mechanism of the target drone,
    by injecting a soft GPS spoofing signal into the target drone to allow tracking the soft GPS spoofing signal without interruption of the GPS receiver and continuously manipulating the soft GPS spoofing signal to allow recognizing a target GPS location determined in consideration of a current location of the target drone, the path-following algorithm of the target drone, and an opposite direction of a predetermined hijacking direction, hijacking the target drone.

8. The method of claim 1, further comprising:
    when a location of the target drone is out of a predetermined protection zone, disabling flight of the target drone through radio jamming.

9. An anti-drone method, the method comprising:
    injecting a first GPS spoofing signal into a target drone
    observing a behavior of the target drone in response to the first GPS spoofing signal;
    identifying and analyzing a feature of the target drone based on the behavior of the target drone, wherein the feature of the target drone is a safety device mechanism (GPS fail-safe) and a path-following algorithm of the target drone;
    selecting a drone hijacking strategy corresponding to the safety device mechanism and the path-following algorithm of the analyzed target drone among predefined drone hijacking strategies from a database of predefined drone hijacking strategies; and hijacking the target drone by injecting a second GPS spoofing signal into the target drone based on the selected drone hijacking strategy.

10. The method of claim 9, wherein the analyzing of the drone feature includes:

by injecting the first GPS spoofing signal for changing a GPS location of the target drone into the target drone to observe a movement direction of the target drone, identifying the path-following algorithm of the target drone based on a result of the observed movement direction; and by observing a flight mode of the target drone before and after activation of a safety device mechanism by the first GPS spoofing signal and after an operation of a GPS receiver of the target drone is restored, identifying the safety device mechanism of the target drone.

11. The method of claim 9, wherein the hijacking of the target drone includes:

by generating the second GPS spoofing signal based on the drone hijacking strategy corresponding to the analyzed drone feature, a measurement location of the target drone, and a predetermined hijacking direction to inject the second GPS spoofing signal into the target drone, hijacking the target drone in the hijacking direction.

12. The method of claim 9, wherein the hijacking of the target drone includes:

when a flight mode is automatically changed to a hovering mode by using GPS after an operation of a GPS receiver of the target drone is restored by a safety device mechanism of the target drone, by injecting a hard GPS spoofing signal into the target drone to allow the GPS receiver to track the hard GPS spoofing signal and continuously manipulating the hard GPS spoofing signal such as moving in an opposite direction of the predetermined hijacking direction, hijacking the target drone.

13. The method of claim 9, wherein the hijacking of the target drone includes:

when an autonomous flight before the safety device mechanism is activated is performed again after an operation of a GPS receiver of the target drone is restored by the safety device mechanism of the target drone, by injecting a hard GPS spoofing signal into the target drone to allow the GPS receiver to track the hard GPS spoofing signal and continuously manipulating the hard GPS spoofing signal to allow the GPS receiver to recognize a target GPS location determined in consideration of a current location of the target drone, the path-following algorithm of the target drone, and an opposite direction of a predetermined hijacking direction, hijacking the target drone.

14. The method of claim 9, wherein the hijacking of the target drone includes:

when the safety device mechanism is maintained after an operation of a GPS receiver of the target drone is restored by the safety device mechanism of the target drone, by injecting a soft GPS spoofing signal into the target drone to allow tracking the soft GPS spoofing signal without interruption of the GPS receiver and continuously manipulating the soft GPS spoofing signal to allow recognizing a target GPS location determined in consideration of a current location of the target drone, a path-following algorithm of the target drone, and an opposite direction of a predetermined hijacking direction, hijacking the target drone.

15. An anti-drone system, the system comprising:

an analysis unit configured to:
  inject a first GPS spoofing signal into a target drone,
  observe a behavior of the target drone in response to the first GPS spoofing signal, and
  identify and analyze a feature of the target drone based on the behavior of the target drone, wherein the feature is selected from a safety device mechanism and a path-following algorithm;

a database comprising predefined drone hijacking strategies based on the feature, and a control unit configured to hijack the target drone by injecting a second GPS spoofing signal into the target drone based on a drone hijacking strategy from the database corresponding to the analyzed drone feature among predefined drone hijacking strategies.

16. The system of claim 15, wherein the analysis unit injects the first GPS spoofing signal to analyze the safety device mechanism (GPS fail-safe) and the path-following algorithm of the target drone.

17. The system of claim 15, wherein the analysis unit identifies the path-following algorithm of the target drone based on a result of the observed movement direction by injecting the first GPS spoofing signal for changing a GPS location of the target drone into the target drone to observe a movement direction of the target drone and identifies the safety device mechanism of the target drone by observing a flight mode of the target drone before and after activation of a safety device mechanism by the first GPS spoofing signal and after an operation of a GPS receiver of the target drone is restored.

18. The system of claim 15, wherein the control unit hijacks the target drone in the hijacking direction by generating the second GPS spoofing signal based on the drone hijacking strategy corresponding to the analyzed drone feature, a measurement location of the target drone, and a predetermined hijacking direction to inject the second GPS spoofing signal into the target drone.

19. The system of claim 15, wherein, when a flight mode is automatically changed to a hovering mode by using GPS after an operation of a GPS receiver of the target drone is restored by a safety device mechanism of the target drone, the control unit hijacks the target drone by injecting a hard GPS spoofing signal into the target drone to allow the GPS receiver to track the hard GPS spoofing signal and continuously manipulating the hard GPS spoofing signal such as moving in an opposite direction of a predetermined hijacking direction.

20. The system of claim 15, wherein, when an autonomous flight before the safety device mechanism is activated is performed again after an operation of a GPS receiver of the target drone is restored by the safety device mechanism of the target drone, the control unit hijacks the target drone by injecting a hard GPS spoofing signal into the target drone to allow the GPS receiver to track the hard GPS spoofing signal and continuously manipulating the hard GPS spoofing signal to allow the GPS receiver to recognize a target GPS location determined in consideration of a current location of the target drone, a path-following algorithm of the target drone, and an opposite direction of a predetermined hijacking direction.

* * * * *